Aug. 25, 1959     L. L. WEINSCHENK     2,901,091
CONVEYOR VERTICAL ADJUSTMENT MEANS
Filed Dec. 6, 1957     2 Sheets-Sheet 1
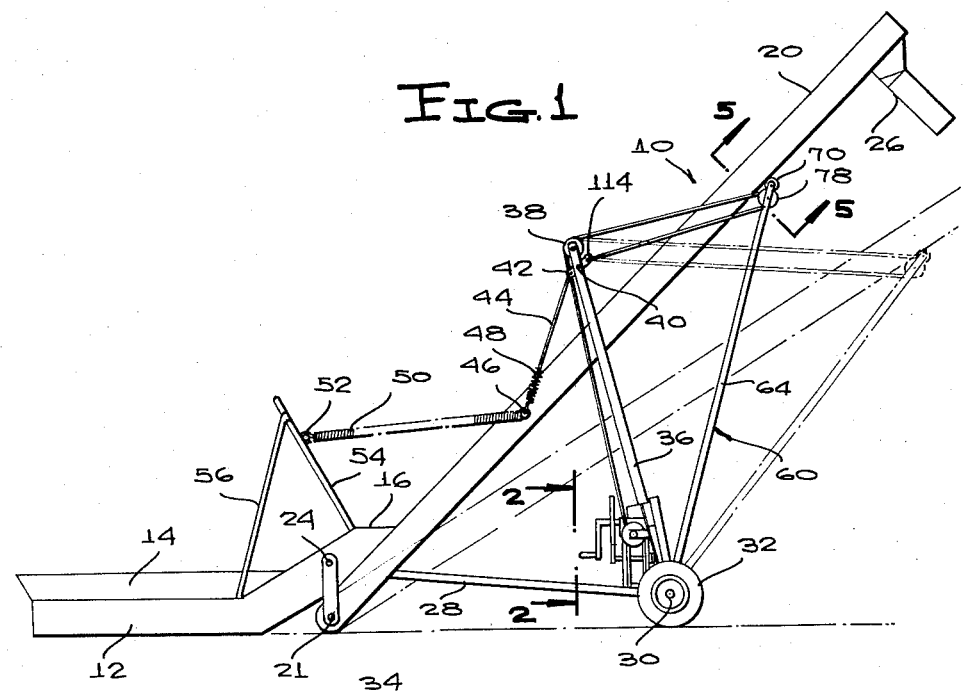
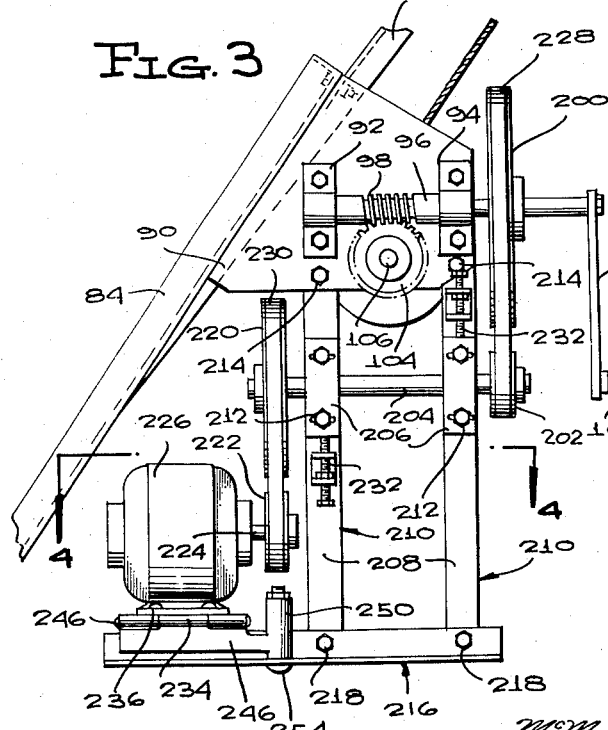
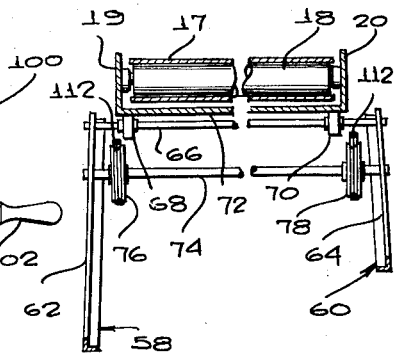
INVENTOR.
LAVERN L. WEINSCHENK
BY
*McMorrow, Berman & Davidson*
ATTORNEYS Aug. 25, 1959   L. L. WEINSCHENK   2,901,091
CONVEYOR VERTICAL ADJUSTMENT MEANS
Filed Dec. 6, 1957   2 Sheets-Sheet 2
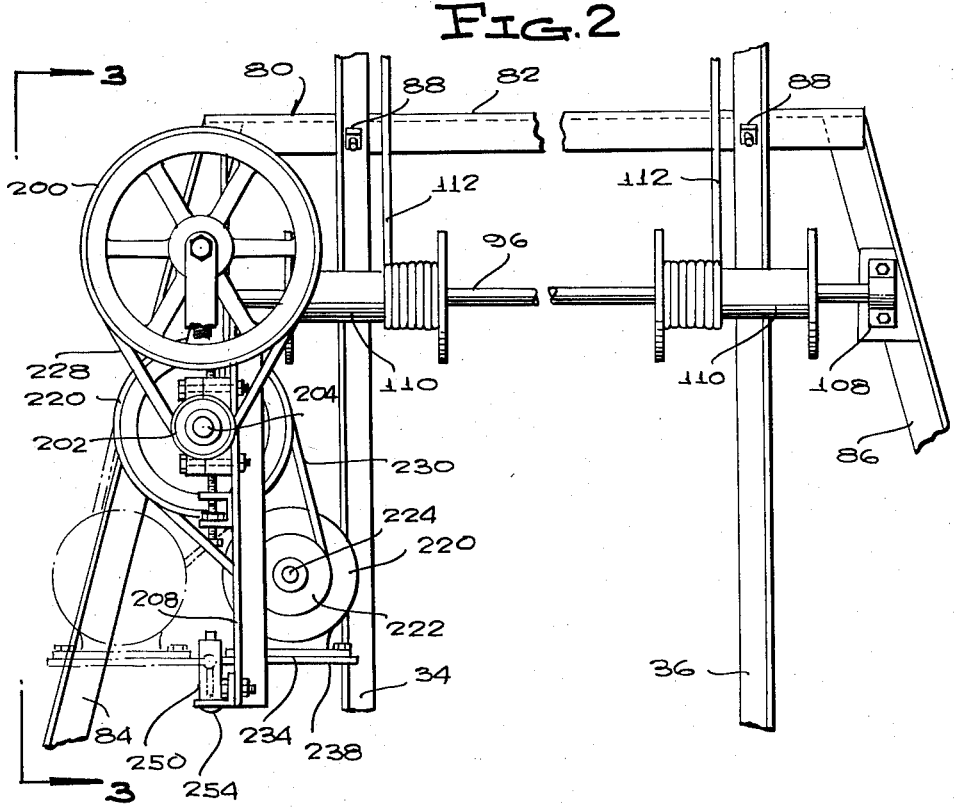
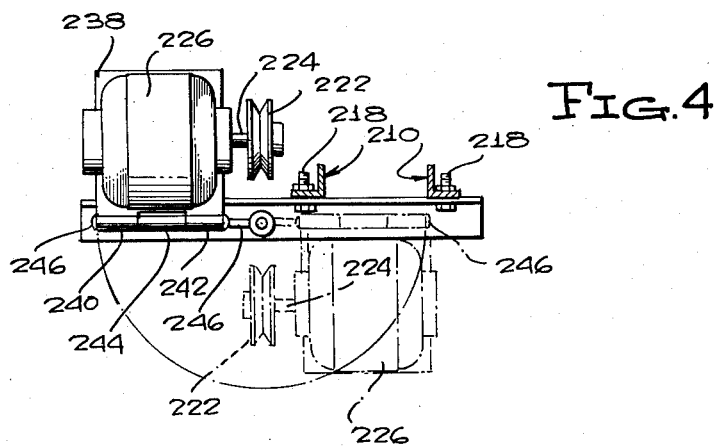
INVENTOR.
LAVERN L. WEINSCHENK
BY
McMorrow, Berman & Davidson
ATTORNEYS 2,901,091

CONVEYOR VERTICAL ADJUSTMENT MEANS

Lavern L. Weinschenk, Bellevue, Iowa

Application December 6, 1957, Serial No. 701,183

6 Claims. (Cl. 198—120.5)

This invention relates to lifting devices and, more specifically, the invention pertains to means for vertically adjusting the angularity of an elongated conveyor frame, the conveyor being of the endless belt type.

One of the primary objects of this invention is to provide a power drive for changing the vertical angle of inclination of an endless belt type conveyor frame.

Another object of this invention is to provide a power drive attachment for selectively adjusting the angularity of conventional endless belt types of conveyor frames without alteration of the existing structure.

A further object of this invention is to provide a reversible power drive for adjustment of the angle of inclination of an endless belt type conveyor frame.

This invention contemplates, as a still further object thereof, the provision of adjustment means of the type referred to generally supra, the device being non-complex in construction and assembly, inexpensive to manufacture, and durable in use.

Other and further objects and advantages of the instant invention will become more evident from a consideration of the following specification when read in conjunction with the annexed drawings, in which:

Figure 1 is a side elevational view of a conventional conveyor and illustrating the power device constructed in accordance with the present invention for changing the angularity of the conveyor frame;

Figure 2 is an enlarged fragmentary front elevational view of the power device, Figure 2 being taken substantially on the vertical plane of line 2—2 of Figure 1, looking in the direction of the arrows;

Figure 3 is a side elevational view of the power drive, Figure 3 being taken substantially on the vertical plane of line 3—3 of Figure 2, looking in the direction of the arrows;

Figure 4 is a detail top plan view of the motor for the power drive including the mounting therefor, Figure 4 being taken substantially on the horizontal plane of line 4—4 of Figure 3, looking in the direction of the arrows; and, Figure 5 is a detail cross-sectional view taken substantially upon the inclined plane of line 5—5 of Figure 1, looking in the direction of the arrows.

Referring now more specifically to the drawings, reference numeral 10 designates, in general, a conventional conveyor of the endless belt type, the structural details of which are presented herein only insofar as is necessary to the understanding of the instant invention.

The conveyor 10 includes a conventional material feeder trough 12 having an outwardly and upwardly flared flange 14. The feeder trough 12 discharges adjacent its upper end at 16 on the lower end of an endless conveyor belt 17 (see Figure 5) supported on rollers 18 which extend between and are mounted on a pair of elongated laterally spaced and substantially parallel side frame members 19, 20 having a generally rectangular configuration.

The lower ends of the side frame members 19, 20 are pivotally connected to the lower ends 21 of a pair of levers 22 disposed, respectively, on opposite sides of the trough 12. The other ends of the levers are pivotally connected at 24 adjacent the discharge end 16 of the trough 12. To the upper ends of the side frame members 19, 20 is fixedly secured a conventional material discharge spout 26.

A pair of brace members 28 have one of their respective ends connected to the opposite sides of the side frame members 19, 20 and extend forwardly for connection with an axle 30 on the opposed ends of which are rotatably mounted a pair of wheels 32. One of the ends of a pair of angle members 34, 36 are connected on the axle 30 and the other ends thereof extend upwardly adjacent the remote sides of the side frame members 19, 20 and terminate at points thereabove. A pair of pulleys 38 are rotatably mounted on the upper ends, respectively, of the angle members 34, 36 and, spaced inwardly from but lying adjacent to each of the pulleys are a pair of plates 40 which are fixedly secured, respectively, to the angle members 34, 36 by any conventional means. As is seen in Figure 1, the plates 40 extend transversely of their respective associated angle members, and to one end of each of the plates 40 is pivotally connected at 42 one end of a strut 44 having its other end pivotally connected to a lug 46, the lug 46 projecting laterally from the remote sides of the side frame members 19, 20. A conventional turn buckle 48 is interposed in each of the struts 44.

Reference numeral 50 denotes a pair of helicoidal springs having one of their respective ends connected with the lugs 46 while the other ends thereof are connected to a crossbar 52 supported on a pair of legs 54 (only one being shown) fixedly secured to the opposed sides of the trough 12. Base members 56 (only one being illustrated) have one of their respective ends fixedly secured to the sides of the trough 12 while the other ends thereof are rigidly secured to the legs 54.

A pair of elongated angle members 56, 58 (see Figures 1 and 5) have one of their respective ends pivotally connected to the axle 30 and the other ends thereof project upwardly towards the side frame members 19, 20. The side flanges 62, 64 of the angle members 58, 60 at their said other ends rotatably support a first cross-shaft 66 on which are secured for rotation therewith a pair of rollers 68, 70. As is seen in Figure 5, the rollers 68, 70 rotatably engage the bottom wall or bight member 72 which extends between the side frame members 19, 20. A second cross-shaft 74 is rotatably journaled in the flanges 62, 64, the cross-shaft 74 being spaced inwardly from the first cross-shaft 76 and having a pair of axially spaced pulleys 76, 78 fixedly secured thereon for rotation therewith. Reference numeral 80 denotes an inverted substantially U-shaped sub-frame having a bight portion 82 from the opposed ends of which downwardly diverge a pair of side arms 84, 86, the lower terminal ends of the latter being mounted on the axle 30. The bight portion 82 is fixedly secured at 88 to the angle members 34, 36, and a plate 90 is rigidly secured to the side arm 84 and projects rearwardly therefrom. A pair of bearing boxes 92, 94 are fixedly secured to the plate 90 and serve as journals for an elongated shaft 96 having a worm gear 98 intermediate the ends thereof. As is seen in Figure 3, one of the terminal ends of the shaft 96 has fixedly secured thereto a crank arm 100 to which is connected a handle 102 whereby the shaft 96 may be manually rotated.

The worm gear 98 is in mesh with the gear 104 fixedly secured on one end of a shaft 106 journalled for rotation in the plate 90, the other end of the shaft 96 being journaled in a bearing block 108 fixedly secured to the arm 86. Adjacent each end of the shaft 96 is fixedly secured for rotation therewith a pair of cable drums 110 to which is anchored one end of a pair of cables 112. The other ends of the cables 112 are trained around the pulleys 38 and the pulleys 76, 78 and are anchored to the other ends of the plates 40 at 114. Thus, as the shaft 106 is manually rotated in one direction to pay out the cables 112, the side frame members 19, 20 are lowered from the full line position illustrated in Figure 1 to the dotted line position shown therein, the rollers 68, 70 moving on the bight portion 72 in the direction of the spout 26 and the angle members 62, 64 pivoting downwardly in a clockwise direction as shown. Reverse rotation of the shaft 106 effects the raising of the side frame members 19, 20 from the dotted line position towards its illustrated full line position.

All of the foregoing specification is conventional in this art and the power drive for effecting the change in the angle of inclination of the side frame members 19, 20, to which the present invention is primarily addressed, is now set forth below.

A first V-belt pulley 200 is fixedly secured on the shaft 96 for rotation therewith adjacent the crank arm 100. The pulley 200 is aligned with a second V-belt pulley 202 having a smaller diameter, the pulley 202 being mounted for rotation on one end of a shaft 204 which is journalled for rotation within a pair of journals 206. The journals 206 are slidably mounted on the flanges 208 of a pair of angle members 210 by means of bolts 212. One of the ends of the angle members 208 are secured to the plate 90 by bolts 214 and an angle member 216 is rigidly secured at 218 to extend transversely across their respective other ends.

To the other end of the shaft 204 is fixedly secured for rotation therewith, a third V-belt pulley 220 the diameter of which is larger than the pulley 202 and less than the diameter of the pulley 200. The pulley 220 is aligned with a fourth V-belt pulley 222 fixedly secured on the drive shaft 224 of an electric motor 226. The pulley 222 has a diameter greater than the pulley 202 but less than the pulley 220. The aligned pairs of pulleys 200, 202 and 220, 222 are connected in driving relation by means of a pair of endless V-belts 228 and 230, respectively. Conventional belt tightening devices 232 maintain the proper tension on the belt 228.

The motor 222 is provided with a base plate 234 which is bolted at 236 to a substantially rectangular hinge plate 238. The hinge plate 238 at one of its respective sides is formed with a pair of longitudinally spaced and aligned hinge barrels 240, 242 which receive therebetween a third hinge barrel 244 integral with one end of a lever 246. A pintle pin 248 pivotally connects the hinge barrels 240, 242 and 244.

As is clearly seen in Figures 3 and 4, the other end of the lever 246 terminates in a vertical boss 250 pivotally connected to the flange 252 of the angle member 216 by means of a pivot pin 254.

Conventional means (not shown) serve to connect the motor 226 with a suitable source of E.M.F.

The operation of the power drive described above is deemed to be self evident. Assuming now that the side frame members 19, 20 are in their respective full line position as is shown in Figure 1 and it is desired to lower the same towards the dotted line position illustrated therein, the motor 226 is energized in such a manner as to cause the shaft 96 to rotate in a clockwise direction (reference being made to Figure 3 of the drawings) through the above described speed reduction pulley drive system. The cables 112 are payed out from their respective drums 110 in the manner described above causing the angle members 34, 36 to pivot clockwise toward their dotted line position illustrated in Figure 1. At the same time, the rollers 68, 70 move on the bight portion 72 towards the spout 26. To raise the side frame members 19, 20 from the dotted line position, the belt 230 is detached from the pulley and the hinge plate 238 and the motor 226 are rotated 180° to assume their dotted line position shown in Figure 4. The belt 230 is again trained around the pulley 222, and the motor 226 is again energized. The shaft 96 in this case, rotates in the opposite direction causing the cables 112 to wind on the drums 110. This causes the angle members 34, 36 to pivot upwardly and the rollers 68, 70 to slide downwardly on the bight portion 72 away from the spout 26 thereby effecting the elevation of the side frame members 19, 20.

It should be here noted that in the power drive described above, the axis of the drive shaft 224 of the motor 226 is disposed in parallel relation relative to the axis of the shaft 204 in either of the two described positions of the drive shaft 224, and that the distance between the two axes is constant under either condition therefore making possible the use of a single belt 230 having a constant belt length.

Cognizance should also be taken of the fact that proper belt tension of the belt 230 is maintained by the weight of the motor 226 and the hinge plate 238 regardless of the position of the shaft 224 when moved to take up slack in the belt 228. To this end, the belt 230 floatingly supports the motor 226 and hinge plate 238 regardless of the adjustments of the belt tightening means 232.

The crank arm 100 and handle 102 may, if desired, be disconnected from the shaft 96 or retained thereon if no source of E.M.F. is available. If the conveyor frame is to be adjusted manually through the crank arm 100 and handle 102, the belt 230 should be removed from the pulleys 220, 222.

Having described and illustrated one embodiment of this invention in detail, it will be understood that the same is offered merely by way of example, and that the present invention is to be limited only by the scope of the following claims.

What is claimed is:

1. In a conveyor having a frame including a bight member from the longitudinally extending sides of which project a pair of laterally spaced, substantially parallel and confronting side frame member, a pair of standards disposed in spaced, parallel and confronting relation, means pivotally connecting one adjacent pair of ends of said standards on said conveyor frame intermediate the ends of said side frame members, a roller mounted on the other end of each of said standards, said rollers engaging one end of said bight and being movable thereon to raise or lower adjacent portions of said one end of said bight relative to the other end thereof, a pulley mounted on each of said standards adjacent said other ends thereof, a first cross-shaft mounted on said conveyor frame and extending transversely of said standards, a pair of axially spaced drums fixedly secured on said first cross-shaft, a cable for each of said drums, each of said cables having one of their ends anchored to said drums, each of said cables, respectively, being trained around said pulleys, means anchoring the other ends of said cables to said conveyor frame, a first gear fixedly secured on said first cross-shaft adjacent an end thereof, a worm gear and shaft therefor supported for rotation on said conveyor frame with the axis of said worm gear shaft disposed perpendicular to the axis of said first cross-shaft and with said worm gear meshing with said first gear, a first pulley fixedly secured to said worm gear shaft for rotation therewith, a second cross-shaft supported for rotation on said conveyor frame with the axes thereof positioned parallel with the axis of said worm gear shaft, said second cross shaft having second and third pulleys fixedly secured to each of its respective ends with said second pulley aligned with said first pulley, a motor having a drive shaft, a fourth pulley mounted on said drive shaft and aligned with said third pulley, means supporting said motor on said conveyor frame, and an endless belt trained around each pair of aligned pulleys.

2. In the conveyor combination defined in claim 1, wherein said last named means include means pivotally supporting said motor on said conveyor frame for swinging movement through an arc of 180°.

3. In combination, a conveyor having a frame and power drive means for selectively adjusting the angle of inclination of said conveyor frame relative to a horizontal plane and a feeder trough for said conveyor; said conveyor frame including a pair of laterally spaced, elongated and substantially parallel side frame members and an intermediate bight member, means pivotally connecting a pair of adjacent ends of said side frame members to the discharge end of said trough; said power drive means including a first pair of laterally spaced and substantially fixed vertical standards located intermediate the ends of said side frame members and being juxtaposed with respect to the remote sides thereof, a pulley mounted for rotation adjacent each upper end of each of said standards, a second pair of vertical laterally spaced and substantially parallel standards, means pivotally connecting the lower ends of said standards on said conveyor frame, a pair of rollers mounted, respectively, on the upper end of said second pair of standards for engagement with said bight member, a shaft extending between and supported on said upper ends of said second pair of standards, a pair of axially spaced pulleys mounted on said last named shaft, a plate fixedly secured to said upper ends of each of said first pair of standards, a shaft supported for rotation between said first pair of standards, a pair of axially spaced drums fixedly secured on said shaft for rotation therewith, a pair of cables having one of their respective ends anchored on said drums, the other ends of said cables being trained around said pulleys and anchored to said plates, an electric motor pivotally supported on said conveyor frame for movement about a horizontal and vertical axis, said motor having a drive shaft, and means connecting said first shaft with said second shaft in driving relation.

4. In a conveyor having a frame including a bight member from the longitudinally extending side of which project a pair of laterally spaced, substantially parallel and confronting side frame members, means pivotally connecting one adjacent pair of ends of said side frame members, means for adjusting the angle of inclination of said conveyor about said pivot means, said adjustable means comprising a first pair of vertical standards having one of their respective adjacent ends fixedly secured to said conveyor frame intermediate the ends thereof and projecting above said side frame members adjacent the remote sides thereof, a pulley rotatably mounted on the other ends of said first pair of standards, respectively, of each of said standards, a plate fixedly secured to each of said first pair of standards adjacent said other ends thereof, a second pair of standards, means pivotally connecting one pair of adjacent ends of said second pair of standards on said conveyor frame intermediate the ends of said side frame members, a first cross-shaft extending transversely across and journalled for rotation on said second pair of standards proximate their respective other pair of adjacent ends, a pair of axially spaced rollers mounted for rotation on said first cross-shaft and adapted to engage and roll on said bight member adjacent the marginal edges thereof, a second cross-shaft extending across and journalled for rotation on said second pair of standards adjacent said first cross-shaft, a pair of axially spaced pulleys mounted on said second cross-shaft, a third cross-shaft extending transversely across and rotatably supported on said first pair of standards, said third cross-shaft having a pair of axially spaced cable drums mounted thereon for rotation therewith, a gear mounted on one end of said third cross-shaft, a shaft having a worm gear formed thereon intermediate its respective ends, means rotatably supporting said last named shaft on said plate, said worm gear meshing with said first gear to effect rotation thereof and consequently of said third cross-shaft and said drums, a pulley fixedly mounted on said worm gear shaft, a pair of elongated angle members having one of their respective adjacent ends connected with and depending from one of said first pair of standards in laterally spaced and substantially parallel relation, a third angle member fixedly secured to and extending transversely across the other pair of adjacent ends of said angle members, a fourth cross-shaft extending across and rotatably mounted on said angle members, said last named shaft having a pulley mounted on each of its opposed ends, one of said last named pulleys being aligned with said first pulley, a motor having a drive shaft with a pulley fixedly secured thereon, means connecting said motor on said third angle member with its said pulley aligned with the other of said pulleys on said fourth cross-shaft, endless belt means connecting each pair of aligned pulleys, and a cable for each of said drums, said cables, respectively, being trained around the pulleys disposed on opposite sides of said frame members and having one of their respective ends connected to said first pair of standards.

5. In a conveyor as defined in claim 4, wherein said connecting means for said motor include means for pivoting said motor about a horizontal and vertical axis.

6. In a conveyor having a frame including a bight member and opposed feeding and discharge ends, means for pivoting said frame about the feeding end of said conveyor, means including a first pair of standards positioned adjacent the remote sides of said frame and having a lower pair of adjacent fixed ends, a pulley mounted on the other ends of each of said first pair of standards, a second pair of standards having a pair of adjacent ends pivotally supported on said frame, a pair of rollers mounted on the other ends of said second standards and engaging said bight portion, a pair of pulleys rotatably supported on said second standards adjacent said other ends thereof, a shaft supported for rotation between said first pair of standards, a pair of cable drums mounted for rotation with said shaft in axially spaced relation, each of said cables being anchored at one of their respective ends to said drums, the other ends of said cables being trained around said pulleys and anchored to said frame, and motor-driven pulley drive means for effecting rotation of said shaft, said last named means including means pivotally connecting said motor for swinging movement about a horizontal and vertical axis, said last named means being subtended from said frame.

References Cited in the file of this patent
UNITED STATES PATENTS 2,568,865    Neighbour et al. _____ Sept. 25, 1951
2,722,129    Randolph _____ Nov. 1, 1955